United States Patent Office 3,305,406
Patented Feb. 21, 1967

3,305,406
METHOD OF FLUXING AN ARTICLE TO BE SOLDERED WITH NONCORROSIVE FLUXING COMPOSITIONS
George F. Chmelik, Downers Grove, John Danaczko, Jr., Oak Park, Jarliv Johnsen, Berwyn, and John E. Kinsey, Chicago, Ill., assignors to Western Electric Company, Incorporated, New York, N.Y., a corporation of New York
No Drawing. Filed Apr. 6, 1964, Ser. No. 357,741
3 Claims. (Cl. 148—23)

This invention relates to a method of fluxing an article to be soldered which utilizes noncorrosive fluxing compositions, and more particularly to such a method wherein the noncorrosive fluxing compositions are of the type wherein the single, active fluxing ingredient is a high molecular weight, carboxylic acid having the hydrocarbon chain interrupted by an amidomethyl group. It is an object of this invention to provide a new method employing fluxing compositions of such a type.

In mass soldering machines, spaced printed circuit boards are fed sequentially over a device which applies solder to the connection side of the board so as to effect electrical interconnections of desired quality between circuit components and etched circuit paths on the board. In general, the solder applying device is designed such that a stream of molten solder is directed across the entire width of the connection side of the board and as the board is moved in a lengthwise direction past the soldering device the entire connection side is engaged by the molten solder. The solder, engaging the board, adheres to and solidifies only in those areas where a metallic surface is presented.

As is well known in the art, in order to insure that an acceptable electrical connection will be formed by the solder between the circuit components and the circuit paths, the connection side of the board must be fluxed prior to the soldering operation. Since a period of time may elapse between the fluxing and soldering operations, as for example where the boards are fluxed on one piece of apparatus and subsequently soldered on another piece of apparatus, it is desirable that the fluxing composition provide a protective layer for the connection side of the board which prevents any corrosive producing attack on the metallic surfaces by moisture contained in the air. Also, it is desirable to utilize a fluxing composition which is not, in and of itself, corrosive toward the metallic surfaces during periods of storage. Further, the fluxing composition should be one which, while acting as an effective cleansing medium for the surface to be soldered, is easily volatilized and completely removed by heat supplied from the molten solder engaging the board. If the flux is not completely removed, residue and scum remains on the board after the soldering operation and the board must be washed thoroughly to produce an acceptable product.

It is another object of this invention to provide a method of fluxing an article to be soldered with fluxing compositions which, when applied to a surface of the article to be soldered, dry thereon to provide a protective coating that is noncorrosive toward the protected surface.

It is still another object of this invention to provide a method of fluxing an article to be soldered with fluxing compositions which, when applied to a surface of the article to be soldered, dry thereon to provide a coating which protects the coated surface from corrosive attack by the moisture of the air.

It is a further object of this invention to provide a method of fluxing an article to be soldered with noncorrosive fluxing compositions which, when applied to a surface of the article to be soldered, are easily volatilized and completely removed from the surface by heat supplied during a soldering operation.

It is a still further object of this invention to provide a method of fluxing an article to be soldered with noncorrosive fluxing compositions which are economical, efficient when utilized and composed of chemicals that are readily obtainable.

In accordance with this invention, a method of fluxing an article to be soldered utilizes noncorrosive fluxing compositions in which the single active fluxing ingredient is a high molecular weight, carboxylic acid having the hydrocarbon chain interrupted by an amidomethyl group. A minor proportion of such an acid, for example, 1 to 5% by volume is dissolved in a major proportion of a suitable vehicle to form the fluxing compositions applied to an article in the practice of the method of this invention.

The active fluxing ingredient utilized in the method of this invention is a high molecular weight, carboxylic acid selected from the group consisting of mono-basic and di-basic acids represented respectively by the structural formulas

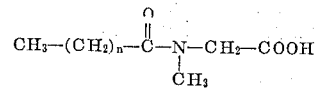

and

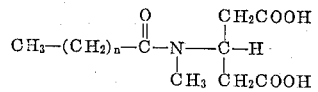

wherein $n$ is 10 to 16. These particular acids have enhanced surfactant properties because of the close proximity of the amidomethyl group ($-CONCH_3-$), to the acid group. These acids are sold by Geigy Industrial Chemicals Company under the respective trade names Sarkosyl and Diasyl.

Suitable vehicles for the active acid have been found to include chlorinated hydrocarbon solvents, alcohols, and mixtures of chlorinated hydrocarbon solvents and/or alcohols with distilled water.

Certain testing procedures were carried out on fluxing compositions utilized with the method of this invention in order to determine the characteristics of such compositions.

A first test, utilized to determine the corrosion prevention characteristics of fluxing compositions employed in the method of this invention, involves immersing individual copper strips in the particular solutions under test, withdrawing the individual strips from the various test solutions and allowing them to dry, and finally, leaving the strips standing in ambient air for a period of one week. If, at the end of the one week period, the copper strips exhibit no corrosion or corrosion deposits on that portion of the strip protected by the fluxing composition, the composition is deemed to be acceptable for use in manufacturing processes from the standpoint of corrosion resistance.

A second testing procedure involves a visual check and an electrical insulation resistance test of printed circuit boards fluxed with a test composition and subsequently soldered. Visual checks are made to determine whether all of the connections on the board have been properly made and the electrical insulation resistance test involves checking the insulation resistance of the printed circuit board both before and after the boards are subjected to a washing operation which follows the soldering operation. The insulation resistance test reveals whether all of the protective flux coating has been removed during the soldering operation as any protective coating remaining after the soldering operation substantially reduces the effective insulation resistance of the board. If there is no substantial variation in the insulation resistance of the board both before and after a washing operation, the flux coating has been substantially removed by the solder.

To illustrate the utility of fluxing compositions employed in the method of this invention, the results of the aforedescribed tests on two representative fluxing compositions are described. The representative compositions are:

Fluxing composition A (percent by volume):
  2% $CH_3(CH_2)_{14}CON(CH_3)CH(CH_2COOH)_2$
  98% isopropyl alcohol
Fluxing composition B (percent by volume):
  2% $CH_3(CH_2)_{14}CON(CH_3)CH_2COOH$
  17% distilled water
  81% trichloroethylene Individual copper strips were immersed in the fluxing compositions A and B, respectively, in order to show the corrosion prevention characteristics of these compositions. When the individual strips were removed from their respective compositions, the vehicles of the compositions evaporated leaving only a thin layer of the active carboxylic acid to form a protective layer for the strip. Inspection of the individual strips after a one week exposure to ambient air revealed that the protected portion of the strip had no corrosion or corrosion deposits thereon, while the unprotected portion of the strip had corrosion deposits thereon.

Thus, the utilization of fluxing compositions containing a minor proportion by volume of the specified carboxylic acids carried in a suitable vehicle were found to be suitable for use in commercial fluxing operations as these fluxes placed an effective corrosion resistance coating over the protected metallic surfaces. The coating effectively resisted a corrosion producing attack of the protected surface by moisture in the air, and further, the coating was, in and of itself, noncorrosive towards the protected metal surface.

Visual and electrical insulation resistance tests were conducted on printed circuit boards that had been processed by a fluxing method utilizing fluxing compositions A and B. Visual checks of the boards showed that the electrical connections had been made properly and were of the desired quality.

The insulation resistance of the boards both before and after a washing operation was substantially identical. Therefore, the carboxylic acid coating was removed by the soldering operation and the washing operation is unnecessary.

Thus, use of the method of this invention which employs fluxing compositions containing the specified carboxylic acids result in a protective flux coating being placed over the metallic surfaces of the printed circuit board. The protective coating is removed during the soldering operation and a subsequent washing operation is rendered unnecessary. Also, the flux is effective in allowing the formation of solder connections of desired quality.

While examples of two representative fluxing compositions utilized with the method of this invention have been specifically disclosed to illustrate the utility of the method, many other compositions formulated under the teachings of this invention may be employed.

The active fluxing ingredient, the high molecular weight, carboxylic acid having the hydrocarbon chain interrupted by an amidomethyl group, can be present in the fluxing compositions in quantities of 1 to 5% by volume of the total composition. From the standpoint of economical considerations versus efficiency of action of such fluxing compositions, a 2% by volume solution of the active acid is preferred.

Since the active acids are soluble in both distilled water and organic solvents, many suitable vehicles may be utilized to carry the active fluxing ingredient. Suitable vehicles for the active acid have been found to include chlorinated hydrocarbon solvents such as trichloroethelene and methylchloroform, alcohols having up to six carbons in their hydrocarbon chain, and mixtures of chlorinated hydrocarbon solvents and/or alcohols with distilled water.

When the vehicles utilized in the fluxing compositions contain distilled water, the water should not exceed 35% by volume of the total composition. If the 35% by volume water limit is exceeded, the fluxing compositions tend to produce a slight corrosive attack on the copper metal because of the relatively large amount of water present. In regard to the use of water in the fluxing compositions, it should be noted that the words "distilled water" include any water wherein the mineral content has been reduced substantially to zero.

As well known in the art, wetting agents such as polyoxyethylene nonyl phenol may be added to fluxing compositions to increase their spreadability over surfaces which are to be coated. Since such wetting agents are generally not present in excess of 0.05% by volume of the total solution and, further, since such wetting agents do not effect the basic characteristics of the fluxing compositions, it is understood that fluxing compositions employing the teachings of this invention and so modified by additions of wetting agents are within the scope of the present invention.

There has been disclosed herein a method of fluxing an article to be soldered which utilizes noncorrosive fluxing compositions wherein the single active fluxing ingredient is a high molecular weight carboxylic acid having the hydrocarbon chain interrupted by an amidomethyl group. These compositions, while being non-corrosive toward metallic surfaces of the article, form a protective layer over metallic surfaces which protect the surfaces from corrosive attack by moisture carried in the air. The coating or protective layer is easily volatilized and completely removed from such a surface by heat supplied during a soldering operation such that a subsequent washing of the fluxed surface is unnecessary to remove the residue remaining from the fluxing operation. The fluxing compositions are economical, efficient when utilized, and composed of chemicals that are readily obtainable.

The basic concept underlying the invention as described above is one which will have many apparent modifications. It is intended that the invention be interpreted as including all the modifications which fall within the true spirit and teachings thereof.

What is claimed is:
1. A method of fluxing an article to be soldered which comprises the step of:
  applying to the surface area of the article to be soldered a noncorrosive fluxing composition consisting of
  a minor proportion by volume of a high molecular weight, carboxylic acid whose hydrocarbon chain is interrupted by an amidomethyl group, selected from the group consisting of mono-basic and di-basic acids represented respectively by the formulas

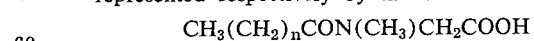
  $CH_3(CH_2)_nCON(CH_3)CH_2COOH$
  and
  $CH_3(CH_2)_nCON(CH_3)CH(CH_2COOH)_2$ wherein $n$ is 10 to 16, and
  a major proportion by volume of a vehicle selected from the group consisting of chlorinated hydrocarbon solvents, alcohols, chlorinated hydrocarbon solvents diluted with distilled water, alcohols diluted with distilled water, and chlorinated hydrocarbon solvents diluted with alcohols and distilled water.

2. A method of fluxing an article to be soldered which comprises the step of:
  applying to the surface area of the article to be soldered a noncorrosive fluxing composition consisting of
  1 to 5% by volume of a high molecular weight, carboxylic acid whose hydrocarbon chain is interrupted by an amidomethyl group, selected from the group consisting of mono-basic and di-basic acids represented respectively by the formulas $$CH_3(CH_2)_nCON(CH_3)CH_2COOH$$
and
$$CH_3(CH_2)_nCON(CH_3)CH(CH_2COOH)_2$$

wherein $n$ is 10 to 16, and 99 to 95% by volume of a vehicle selected from the group consisting of chlorinated hydrocarbon solvents, alcohols having not more than six carbon atoms in their hydrocarbon chains, chlorinated hydrocarbon solvents diluted with distilled water, alcohols having not more than six carbon atoms in their hydrocarbon chains diluted with distilled water, and chlorinated hydrocarbon solvents diluted with alcohols having not more than six carbon atoms in their hydrocarbon chains and distilled water, the distilled water in any vehicle not exceeding 35% by volume of the total fluxing composition.

3. The method of fluxing an article to be soldered as specified in claim 2 wherein said noncorrosive fluxing composition consists of 2% by volume of said high molecular weight, carboxylic acid and 98% by volume of said vehicle.

References Cited by the Examiner
UNITED STATES PATENTS

| | | | |
|---|---|---|---|
| 2,581,820 | 1/1952 | Stright | 148—23 |
| 3,034,907 | 5/1962 | Fleemann et al. | 106—14 |
| 3,220,892 | 11/1965 | Durham | 148—23 |

OTHER REFERENCES

Geigy Surfactants, Geigy Industrial Chemicals, 1959, pages 2 and 6.

DAVID L. RECK, *Primary Examiner.*

HYLAND BIZOT, *Examiner.*

H. F. SAITO, *Assistant Examiner.*